UNITED STATES PATENT OFFICE.

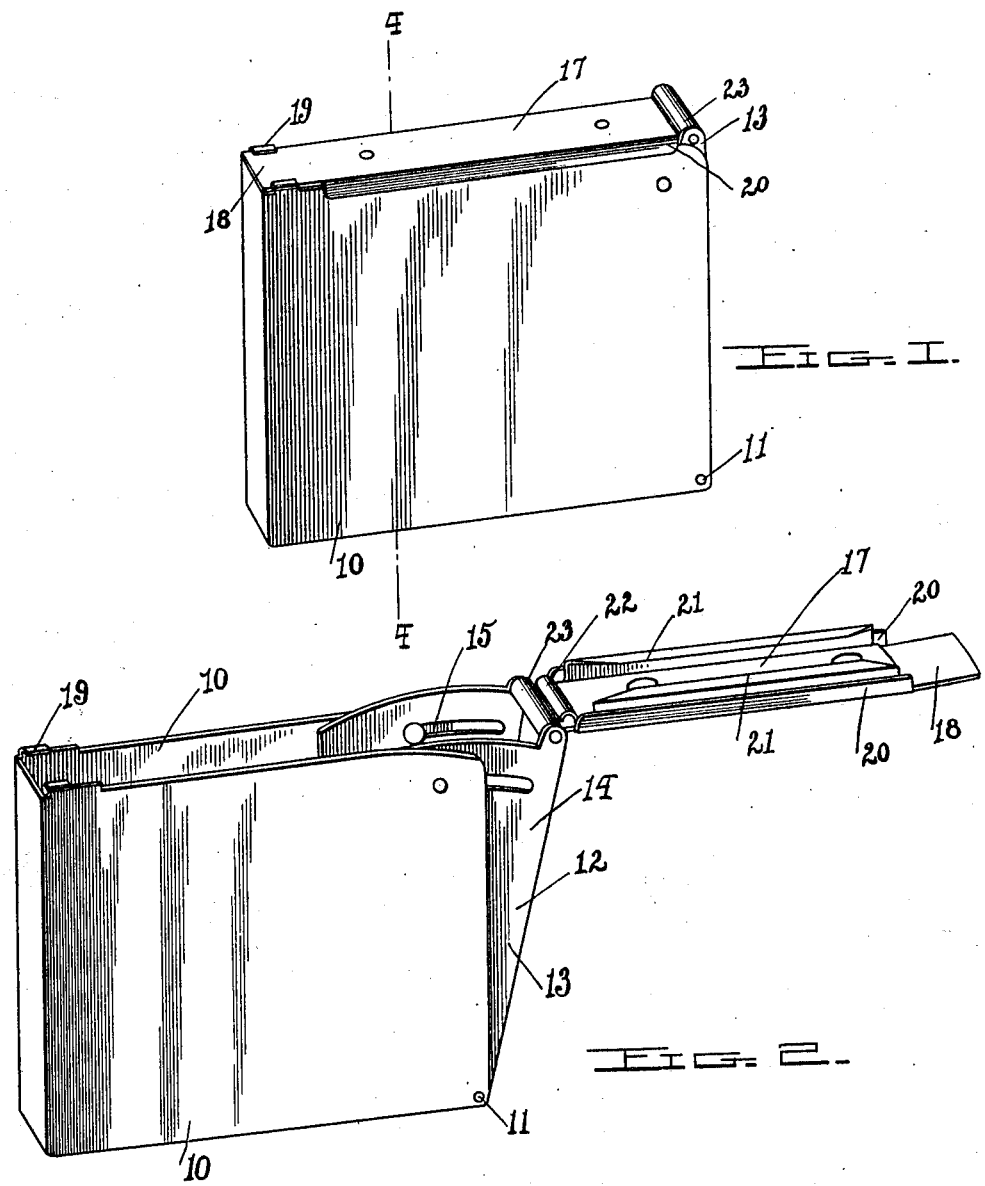

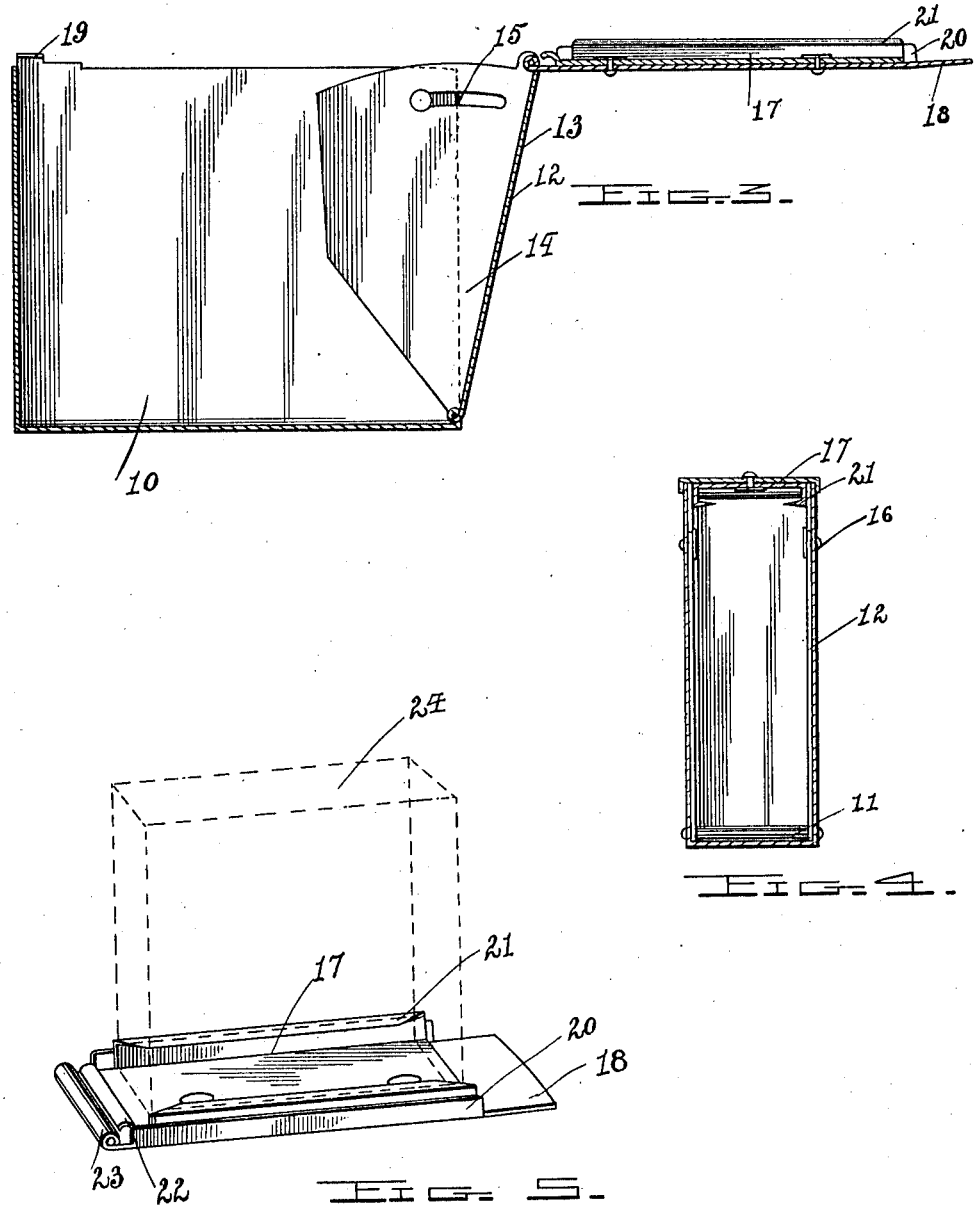

FERNAN N. PHILLIPPAR AND PETER J. DESSELLE, OF WEIR, KANSAS.

CONTAINER.

1,026,453.　　　　　Specification of Letters Patent.　　Patented May 14, 1912.

Application filed July 29, 1911.　Serial No. 641,192.

*To all whom it may concern:*

Be it known that we, FERNAN N. PHILLIPPAR and PETER J. DESSELLE, citizens of the United States, residing at Weir, in the county of Cherokee and State of Kansas, have invented new and useful Improvements in Containers, of which the following is a specification.

The invention relates to containers and has for an object to provide a container in which the article contained therein can be withdrawn therefrom without removing the article from connection with the container.

For the purpose mentioned, use is made of a casing provided with a slidable member forming one of the walls of the casing, gripping means mounted to operate with the sliding member, the said gripping means being adapted for gripping engagement with the article to be disposed in the container and a cover for removable engagement with the container.

Reference is to be had to the accompanying drawings constituting a part of this specification, in which similar characters of reference denote corresponding parts in all the views, and in which—

Figure 1 is a perspective view of the container, the cover being shown in closed position. Fig. 2 is a perspective view of the container with the cover in open position. Fig. 3 is a vertical longitudinal sectional view, the cover being in open position. Fig. 4 is a vertical transverse sectional view taken on the line 4—4 of Fig. 1. Fig. 5 is a fragmentary perspective view of the under side of the cover, the dotted lines denoting an article connected to the cover.

Referring more particularly to the views, I provide a casing 10 provided with a transversely extending pin 11 on which is mounted to turn a casing section 12, the said casing section being adapted to form one end of the casing 10. The casing section 12 consists primarily of an end portion 13 and laterally extending sides 14 provided with slots 15 through which are extended pins 16 secured to the casing 10, the sides 14 being adapted to slide within the sides of the casing 10 as shown in Fig. 2.

Mounted to swing on the section 12 is a cover 17, the said cover being provided with reduced end 18 for slidable engagement with retaining lugs 19 formed on the casing 10 at one end thereof. The cover 17 has the sides thereof bent to form guides 20, which overlap the upper edge of the casing 10 when the cover is engaged therewith and secured to the said cover between the sides 20 are gripping members 21, a stop flange 22 being formed at one end of the cover and adjacent the point 23, where the cover is hinged to the section 12.

In the use of the device as a chewing tobacco container, a plug of chewing tobacco 24 is slidably engaged by the gripping members 21 as shown in Fig. 4 of the drawing, the stop flange 22 being provided to limit the movement of the plug of tobacco 24 so that the said plug will not interfere with the swinging movement of the cover 17 on the section 12 as will be readily understood.

Now assuming that the cover 17 is in closed position as shown in Fig. 1, the reduced end 18 of the cover being retained in locking engagement with the lugs 19, when it is desired to withdraw the plug of tobacco from the casing 10, the cover 17 is grasped and operated so that the reduced end 18 will be disengaged from the retaining lugs 19. As the cover is operated as mentioned, the section 12 will be slid outwardly from the casing as shown in Fig. 2 and then by pulling upwardly on the cover 17 the same can be swung outwardly and away from the casing, thus withdrawing the plug of tobacco 24 from the casing, it being understood that the pins 16 limit the sliding movement of the section 12.

Although the container has been shown as used in connection with chewing tobacco, it will be readily seen that the container can be employed to contain various other substances and materials and although the plug of tobacco 24 has been shown mounted on the cover 17, it will be further seen that an article can be used in connection with the section 12, which can be given a greater sliding movement with the cover mounted independently thereof, it being understood that the mentioned description and the structure shown do not limit the uses and precise structure of the device, the scope of the invention being defined in the appended claims.

Having thus fully described the invention what we claim as new, is:—

1. A container comprising a casing, a section mounted to slide and to turn on the said casing and forming one end thereof, a cover pivotally mounted on the said section and adapted for engagement with the said casing, gripping members on the said cover, a stop flange formed at one end of the said cover and retaining lugs formed on the said casing and adapted to be engaged by the said cover to retain the same in locking engagement with the said casing.

2. A container comprising a casing, a section mounted to slide and to turn on the said casing and forming one end thereof, a cover pivotally mounted on the said section and adapted for engagement with the said casing, gripping members on the said cover and means formed on the said casing and adapted to be engaged by the said cover to retain the same in locking engagement with the casing.

3. A container comprising a casing, a section mounted to slide and to turn on the said casing and forming one end thereof, a cover pivotally mounted on the said section and adapted for engagement with the said casing, gripping members on the said cover, a stop flange formed at one end of the said cover and means formed on the said casing and adapted to be engaged by the said cover to retain the same in locking engagement with the said casing.

In testimony whereof we affix our signatures in presence of two witnesses.

FERNAN N. PHILLIPPAR.
PETER J. DESSELLE.

Witnesses:
V. A. MILLER,
W. J. ROGERS.

Copies of this patent may be obtained for five cents each, by addressing the "Commissioner of Patents, Washington, D. C."